United States Patent [19]
McKinney

[11] 3,785,629
[45] Jan. 15, 1974

[54] APPARATUS FOR GAS DIFFUSION

[75] Inventor: Lawrence A. McKinney, Tucson, Ariz.

[73] Assignee: Westinghouse Electric Corporation, Pittsburgh, Pa.

[22] Filed: Jan. 20, 1971

[21] Appl. No.: 108,041

[52] U.S. Cl.............................. 261/122, 261/DIG. 47
[51] Int. Cl................................................. C02c 1/12
[58] Field of Search..................... 261/122, DIG. 47; 239/54, 145

[56] References Cited
UNITED STATES PATENTS

| | | | |
|---|---|---|---|
| 3,174,733 | 3/1965 | Chase | 261/DIG. 47 X |
| 3,603,509 | 9/1971 | Nechine | 261/122 X |
| 3,552,654 | 1/1971 | Thomas | 239/145 |
| 3,116,021 | 12/1963 | Born | 261/DIG. 47 X |
| 2,521,454 | 9/1950 | Dressler | 261/DIG. 47 X |
| 3,293,174 | 12/1966 | Robjohns | 261/94 X |
| 3,644,231 | 2/1972 | Maruya et al. | 261/122 X |
| 3,583,635 | 6/1971 | Lemelson | 239/145 |
| 2,715,099 | 8/1955 | Stuart | 261/DIG. 47 X |

OTHER PUBLICATIONS

"Chicago Swing Diffuser;" Chicago Pump Co., February 1943, pp. 1-9 and 14-16.

Primary Examiner—Frank W. Lutter
Assistant Examiner—William Cuchlinski, Jr.
Attorney—A. T. Stratton, Z. L. Dermer and M. B. L. Hepps

[57] ABSTRACT

A plurality of high density polyethylene or polyvinylchloride, plastic, diffuser elements are supported on a horizontal distribution header which is in turn supportedly suspended within a waste treatment basin from at least two vertically oriented elongated members. The elongated members are each provided with a hinged joint so that the diffusers can be rotated about the hinged joint to a location out of the basin for cleaning or replacement.

4 Claims, 3 Drawing Figures

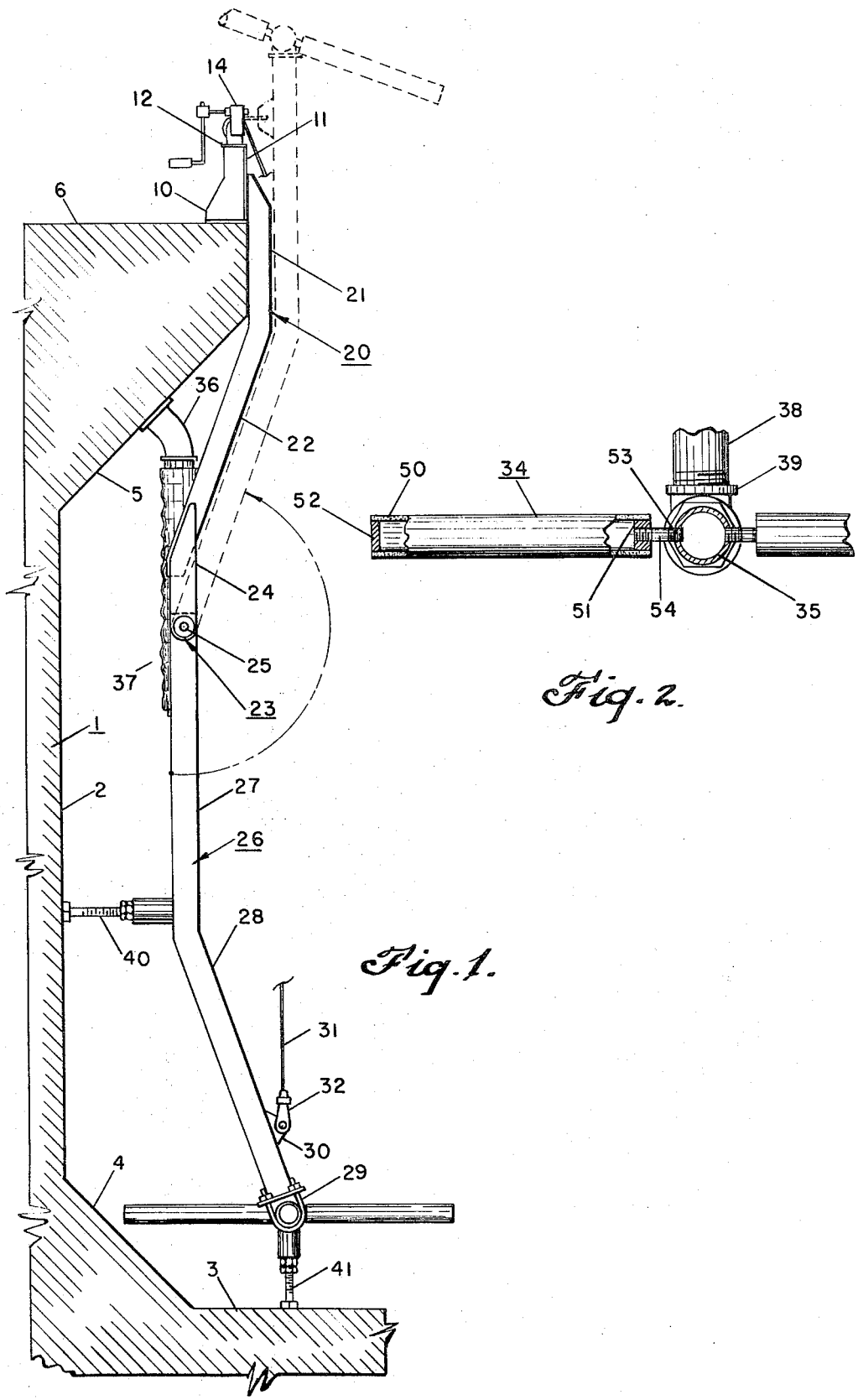

APPARATUS FOR GAS DIFFUSION

BACKGROUND OF THE INVENTION

This invention pertains to swing diffuser aeration devices for use in waste treatment systems, and more particularly to such devices wherein a single distribution header feeds a plurality of diffusers.

Methods of introducing gas into sewage and waste water generally fall into the categories of (1) Diffused air wherein air under pressure is delivered to a diffuser which introduces the air as fine bubbles into the liquid, and (2) Mechanical aeration systems where entrainment of oxygen is achieved by agitating the liquid with a rotating impeller-type device that promotes contact between the atmospheric air and the liquid undergoing treatment.

For many years, porous media diffusers made of ceramic, stone, or bonded aluminum oxide, were the most widely accepted means of introducing air or gas into waste liquid but due to problems of clogging they have been generally replaced by either mechanical surface type aerators or compressed air diffusers utilizing perforated pipe. Mechanical aerators are high in first cost, and although quite efficient, require continuous maintenance. Perforated pipe diffusers, although less expensive, are extremely inefficient in transferring oxygen to the liquid.

Moreover, the diffusers of the prior art were generally supportedly suspended from a single vertical support and swing mechanism. The number of diffusers per assembly was accordingly relatively small. Thus, the number of swing mechanisms was proportionately increased with attendant increases in cost.

SUMMARY OF THE INVENTION

According to the present invention the low capital cost of the pressurized air system is realized along with the entrainment efficiency of porous-type diffusers without the normal attending clogging problem. Further, the number of diffusers per swing-type diffuser unit may be substantially increased.

The mechanical swing frame of our device comprises two upper vertical supports spaced from each other and each support is rigidly secured to the basin, preferably on the edge of the basin along the walkway. These supports depend into the tank and have hinged joints at their lower end. Pivotally affixed to each hinge of the upper support is a lower leg carrying the diffuser assembly which in its operative position rests on stops which contact the basin wall and/or floor. A cable attached to hoisting means coupled to each lower leg is accessible from the walkway and provides the linkage for raising and lowering the diffuser assembly by rotating the lower legs and assembly about the hinges.

The diffuser assembly itself includes a horizontal main air header with a plurality of spaced apart diffuser elements extending outwardly from the header along its length. The elements deliver the gas into the liquid and are preferably made from a permeable, high density polyethylene or polyvinylchloride to provide superior diffuser efficiency and oxygen adsorption as hereinafter discussed. Compressed air is supplied to the main header through a reinforced flexible air hose that connects the header to a source of pressurized air. The air flows from the header into the elements and passes through the element walls and is diffused in a uniform manner into the liquid.

As used throughout this specification, "liquid" means any liquid susceptible to treatment with a gas as for instance water, sewage, waste water and the like.

The terms "air" and "aeration" are used in a generic sense to refer to the introduction of any appropriate gas.

It will be understood that "permeability" is the capacity of a specified area of a porous medium to pass air under specified conditions of temperature and pressure. The higher the permeability rating the more coarse the diffuser media.

It is desirable to have low permeability diffusers as smaller air bubbles are produced thereby. The rate of absorption is proportional to the area of contact between the liquid and air. However, diffusers of low permeability, which provide the best efficiency, tend to clog relatively fast and hence decrease in efficiency with use. We have found a method of introducing air into a liquid through a low permeability surface without the decrease in efficiency with partial clogging previously encountered.

DESCRIPTION OF THE DRAWINGS

A clear and complete understanding of our invention will be apparent from a study of the following specifications and accompanying illustrative drawings in which like reference numbers indicate similar elements wherein:

FIG. 1 is a side elevational view of our swing diffuser showing the diffuser in a basin in an operational position with the inverted position of the assembly being represented in dotted outline;

FIG. 2 is a partial sectional view of the air header and diffuser elements taken along lines 2—2 of FIG. 3.

DESCRIPTION OF A PREFERRED EMBODIMENT

Figure 3:
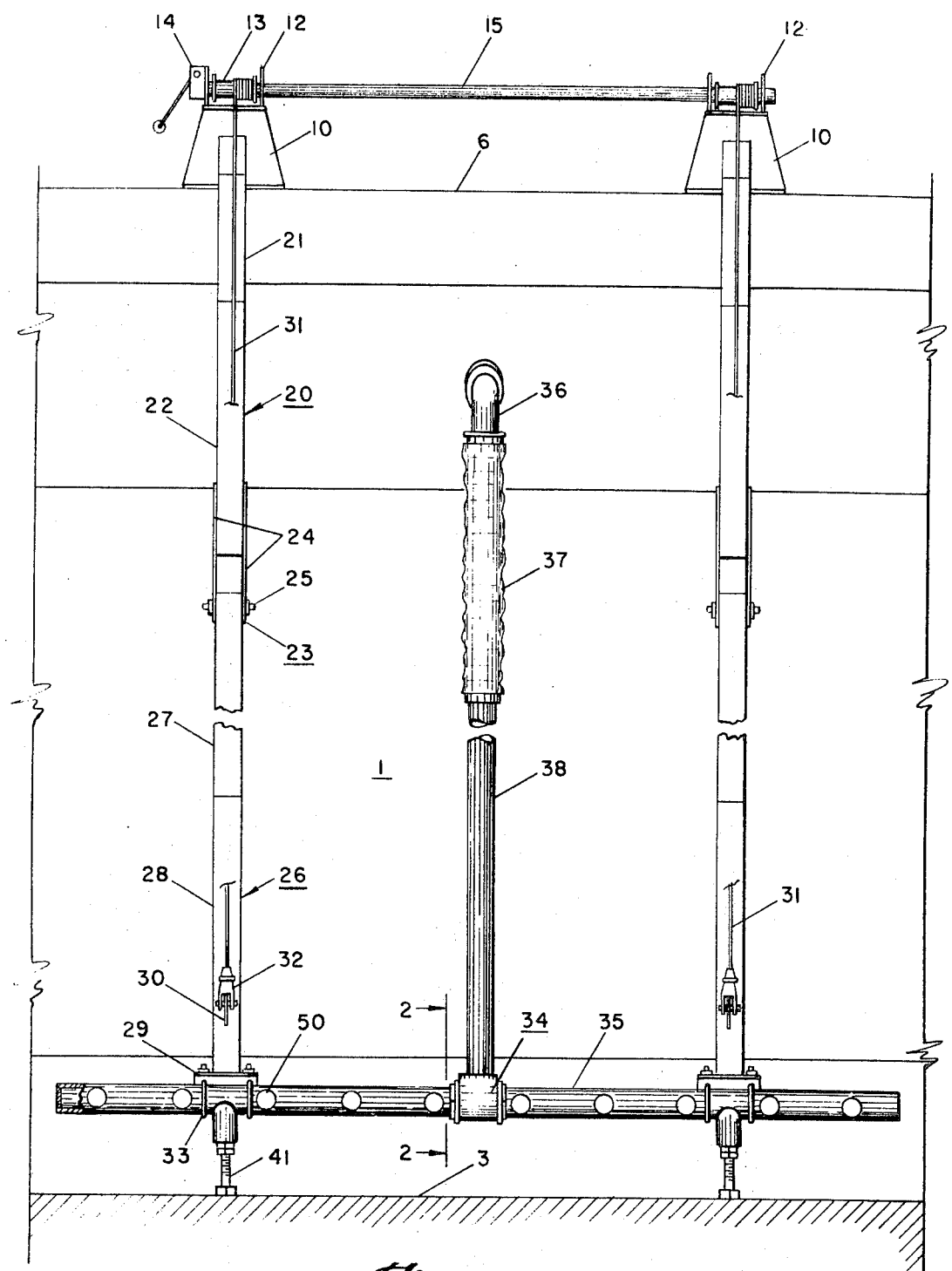
FIG. 3 is a front elevational view showing the diffuser assembly in a lowered operational position.

Referring to the drawings, 1 represents a waste water aeration basin of standard design, having vertical wall 2, floor 3, and lower fillet 4, and upper coping 5. A walkway floor 6, along the top of the basin provides access to the basin and to the diffuser unit for observation and maintenance.

A pair of stationary anchors or stanchions 10 are provided for each diffuser assembly. The stanchions 10 are affixed to walkway 6 having a face plate 11 flush with the vertical edge of coping 5. As shown in FIG. 3 the stanchions are spaced apart a horizontal distance whereby they give support to the diffuser unit near the end of the diffuser unit.

Secured to the top of each stanchion is reel support 12 in the form of a bridle. A shaft 15 is rotatably secured in the vertical side walls of the reel support and extends between the reel support on each stanchion 10. A take-up reel 13 is secured to shaft 15, for instance by set screws, between the vertical side walls of each reel support. A worm gear type winch 14 cooperates with one end of shaft 15 to provide a mechanical means for rotating the reels 13. This winch 14 may either be hand operated or of the type which is adapted to be operated by a portable electric or pneumatic tool. It is clear that the single winch 14 causes the shaft 15 and both take-up reels 13 to rotate as a single unit.

Rigidly affixed to face plate 11 of stanchion 10 is an upper frame member assembly 20. This member depends vertically into the basin to approximately half the basin depth and includes vertical leg 21 and a lower leg 22 which forms an obtuse angle with the upper leg so that the terminal end of the frame 20 is recessed beneath the basin coping 5.

Mounted at the lower end of each member 22, is a hinge assembly 23 including vertical spaced apart hinge plates 24 affixed to the sides of member 22. Axle stubs 25 extend between hinge plates 24 held in place by collars to provide a pivot. Pivotally attached at its upper ends to upper frames 20 are lower pivotal sections 26 which includes upper vertical legs 27 and lower angular legs 28. The upper ends of legs 27 are pivotally secured to hinge assemblies 23 by axles 25 which extends horizontally between hinge plates 24 and through holes provided in the upper end of legs 27. The lower ends of sections 26 terminate a distance above basin floor 3 and are provided with horizontal flanges 29. The obtuse outward angle formed between legs 27 and 28 is identical to the angle between legs 21 and 22 and the relationships of the length of these legs is such that when section 27 is rotated vertically about axle 25 it comes to rest in an inverted nestling position adjacent to upper member 20. When lower section 26 is in an inverted position the plant operator has easy access for inspection or repair to the diffuser assembly. The angular configuration of frames 20 and 26 provides the necessary movement arm for raising and lowering the diffuser assembly into the tank as the pivot point is horizontally spaced apart from take-up reel 13. The frame members 20 and 26 are shown as box channels but may be of any suitable structural shape such as pipe or flanged beams.

A lifting lug 30 is secured, as by welding, near the bottom of each leg 26 and a cable 31 is connected thereto by a suitable cable clamp 32, the outer end of the cable being wound around take-up reel 13 on the stanchion.

The diffuser assembly 34 including a main air header 35 extends longitudinally between lower pivotal sections 26 and is attached at their lower ends to flanges 29 by U-bolts 33. Air under pressure, from a source not shown, is supplied to the header from outlet fitting 36 shown secured on the under-side of fillet 5. A flexible reinforced air hose 37, such as rubber or polyethylene, is sealed or clamped to the fitting with the outer end being affixed to a length of steel air pipe 38. A tee fitting 39 receives air pipe 38 and air header 35 is screwed or flanged into the remaining two sockets on the run of the tee 39. It will be understood that the air need not be supplied through fillet 5 but can be supplied to the diffuser header 35 by any convenient piping such as by utilizing the upper and lower members 20 and 26 as conduits and joining them at their pivot point by a flexible reinforced hose.

Horizontal stops 40 and vertical stops 41 on lower members 26 and on the underside of the air header 35, respectively, act to support part of the weight of the entire swing tube assembly as well as giving longitudinal and lateral stability to the unit as the agitation within the tank caused by the release of the compressed air creates a bumping as well as a buoyance tendency. These stops preferably have threaded body which can be screwed in and out, to provide adjustability.

Diffuser elements, generally designated as 50, extend outwardly from along the length of air header 35 of diffuser assembly 34. Preferably these elements are horizontal, equally spaced, and protrude both toward the basin wall as well as extending away from the wall when the diffuser is in a lowered position.

The elements 50 are preferably cylindrical in shape but may be any uniform cross-section with the outer end being sealed by an insert 52. The inner end contains a threaded solid polyethylene insert 51 which is tapped with female threads. A short threaded nipple 54 is screwed into the insert for securing the element 50 to internal threads in the header. A plug 52 is inserted into the outer end of element 50. Plug 52 is preferably gas permeable such as expanded polyethylene. This arrangement facilitates easy installation and removal of the individual diffuser elements for repair or cleaning.

A very important object of our invention is to provide an improved method of introducing the air into the liquid undergoing treatment. The present invention comprehends a simple and efficient diffuser element for achieving improved air entrainment.

The unique feature of the diffuser elements 50 is their construction as they are formed from a high density polyethylene or polyvinylchloride of a closely controlled permeability. We have found the characteristics of these plastics extremely good for aeration of waste water and sewage. These synthetics have exceptional resistance to corrosion, are very porous and resist clogging. It is well-known that the rate of oxygen absorption or efficiency, generally decreases with high permeability; however, low permeability diffusion elements decrease in efficiency with partial clogging. The diffusers of our design have a permeability rating of about 20 to 30 compared to an average of 40 to 80 for prior devices which are necessary because of the clogging tendencies. Specifically, we prefer to use a permeable plastic of the linear, high density polyethylene or polyvinylchloride based type, which has been formed to the required controlled porousity by a sintering process. Typical of these types of plastic is a porous plastic marketed under the tradename of VYON and manufactured by Atlas Minerals and Chemical Division, Mertztown, Pa. These plastics have rigidity to withstand the bumping and stresses caused by the air pressure and good resistivity to water and sewage. Most important, they have closely controlled low permeability which results in superior air liberation results. The low permeability and high resistance to gas flow results in the equal distrubition and creation of many fine bubbles of air as the air passes through the surface of the diffusers into the liquid. The equal distribution along the length and through the entire surface of the elements permits increased efficiencies. The new use of this material we believe to be unique and non-analogous to any of its prior uses and results in a superior aeration process.

With our aeration diffusers, after considerable usage, when cleaning does become necessary, it may be economically justifiable to discard the clogged tubes and replace them with new ones. The cost of labor involved in cleaning the original tubes may often be more than the cost of replacement elements.

In the normal use position our device is the lowered position as shown in solid lines in FIGS. 1 and 2 with the diffuser assembly 34 resting on the basin floor. Air enters, from a compressor not shown, through fitting 36, flexible tube 37, into header 35, and is uniformly distributed through the entire surface and along the length of diffuser elements 50 in a rising blanket of finely dispersed bubbles. The unique characteristics of the above described diffuser element material allows efficient air entrainment into the waste liquid.

The characteristic of our diffuser element allowing uniform finely dispersed air distribution across the entire surface area and providing a continuous curtain of air bubbles with a much greater surface area of contact between liquid and air gives greater air entrainment efficiency than has theretofore been possible with prior air devices.

I claim as my invention:

1. A swing type air distributor for treating waste water within a basin comprising:

support means affixed to the top surface of a wall of the basin;

at least two separate elongated support members laterally spaced from each other along said wall affixed to said support means, said support members depending vertically from the support means into said basin;

a header generally horizontally disposed within said basin proximate the floor of same, and being connected to the lower ends of said support members;

a plurality of hollow diffusers coupled to said header;

a conduit for supply of air under pressure to said diffusers via said header;

each of said support members comprising upper and lower legs having a hinge therebetween which permits raising the header to a location proximate the top surface of said basin;

said support means comprising spaced stanchions on said wall;

a shaft supported by said stanchions;

means for driving said shaft; and a cable connecting the lower leg of each of said support members to said shaft so that as the drive means rotates the shaft, the support members and attached header are drawn upwardly by the cables to a position proximate the top surface of said wall.

2. The distributor of claim 1 wherein each support member includes said upper leg and lower leg, said legs being connected by said hinge, each of said legs being formed with an obtuse angle therein and of a configuration whereby the lower leg conformably nestles against the upper leg when said header is in its raised position.

3. The distributor of claim 2 wherein the conduit includes a portion of sufficient flexibility to allow bending.

4. The distributor of claim 1 wherein the diffusers are formed from a porous high density plastic having a permeability rating in the range of about 20 to 30 for liberating air in the form of fine bubbles as the air passes through the diffuser surface into a liquid.

* * * * *